United States Patent
Smith et al.

(10) Patent No.: US 11,312,896 B2
(45) Date of Patent: Apr. 26, 2022

(54) ACID EMULSIFIER TECHNOLOGY FOR CONTINUOUS MIXED EMULSIFIED ACID SYSTEMS

(71) Applicant: The Lubrizol Corporation, Wickliffe, OH (US)

(72) Inventors: Kern L. Smith, The Woodlands, TX (US); Nicole Shimek, San Antonio, TX (US); Nadia M. Mojica, Roswell, NM (US)

(73) Assignee: The Lubrizol Corporation, Wickliife, OH (US)

( * ) Notice: Subject to any disclaimer, the term of this patent is extended or adjusted under 35 U.S.C. 154(b) by 423 days.

(21) Appl. No.: 16/341,569

(22) PCT Filed: Sep. 1, 2017

(86) PCT No.: PCT/US2017/049848
§ 371 (c)(1),
(2) Date: Apr. 12, 2019

(87) PCT Pub. No.: WO2018/075147
PCT Pub. Date: Apr. 26, 2018

(65) Prior Publication Data
US 2021/0340433 A1    Nov. 4, 2021

Related U.S. Application Data

(60) Provisional application No. 62/408,792, filed on Oct. 17, 2016.

(51) Int. Cl.
| | |
|---|---|
| *E21B 43/27* | (2006.01) |
| *C09K 8/74* | (2006.01) |
| *C09K 8/72* | (2006.01) |
| *C09K 8/60* | (2006.01) |
| *C09K 8/54* | (2006.01) |
| *C09K 8/524* | (2006.01) |

(52) U.S. Cl.
CPC .............. *C09K 8/725* (2013.01); *C09K 8/524* (2013.01); *C09K 8/54* (2013.01); *C09K 8/604* (2013.01); *C09K 8/74* (2013.01); *E21B 43/27* (2020.05); *C09K 2208/12* (2013.01); *C09K 2208/20* (2013.01); *C09K 2208/28* (2013.01); *C09K 2208/32* (2013.01)

(58) Field of Classification Search
CPC ........ C09K 8/725; C09K 8/524; C09K 8/604; C09K 8/74; C09K 2208/12; C09K 2208/20; C09K 2208/28; C09K 2208/32; E21B 43/27; E21B 43/26; E21B 43/13
See application file for complete search history.

(56) References Cited

U.S. PATENT DOCUMENTS

| | | | | |
|---|---|---|---|---|
| 3,216,936 A | * | 11/1965 | Le Suer | C08F 8/46 508/237 |
| 3,269,946 A | * | 8/1966 | Wiese | C10M 133/52 508/287 |
| 4,708,753 A | | 11/1987 | Forseberg | |
| 5,637,557 A | | 6/1997 | Jahnke | |
| 7,651,984 B2 | * | 1/2010 | Cook | C10M 141/12 508/178 |
| 10,378,325 B2 | * | 8/2019 | Panga | C09K 8/74 |
| 2014/0073540 A1 | | 3/2014 | Berry | |
| 2014/0329725 A1 | * | 11/2014 | Karale | C09K 8/72 507/225 |

* cited by examiner

*Primary Examiner* — Silvana C Runyan
(74) *Attorney, Agent, or Firm* — Christopher Demas; Vincent Cortese; Teresan Gilbert

(57) ABSTRACT

In one embodiment, the present technology provides a surfactant composition comprising an imide compound in an optional solvent for use in a hydrocarbon base fluid to improve the emulsification of an acidizing agent in the hydrocarbon base fluid. In another embodiment, the present technology provides a method of employing an acidizing well-bore stimulation fluid containing the surfactant composition to stimulate a reservoir.

26 Claims, No Drawings

ACID EMULSIFIER TECHNOLOGY FOR CONTINUOUS MIXED EMULSIFIED ACID SYSTEMS

BACKGROUND OF THE INVENTION

In one embodiment, the present technology provides a surfactant composition comprising an imide compound in an optional solvent for use in a hydrocarbon base fluid to improve the emulsification of an acidizing agent in the hydrocarbon base fluid. In another embodiment, the present technology provides a method of employing an acidizing well-bore stimulation fluid containing the surfactant composition to stimulate a reservoir.

Current practice in preparing acidizing fluids for treatment of carbonate formations, with elevated downhole temperatures, is to prepare a stable emulsion of the acidizing agent utilizing a batch mixing process. Unless a stable emulsion is created, the acidizing agent will separate out of the hydrocarbon base fluid and result in ineffective well stimulation due to poor wormhole propagation, poor etched patterns and excessive corrosion of well tubulars. The batch mixing process requires a lengthy period of mixing to ensure fluid stability at downhole conditions, especially for high temperatures. Typically it takes about 3-4 hours to prepare a 500 barrel mixing tank. This batch process also commits the user to a certain acid blend that cannot be changed on the job, should the well response dictate otherwise.

A need exists for a continuous, or "on-the-fly" method to prepare an acidizing fluid. This will improve field operational efficiency and provide an opportunity to reduce environmental hazards associated with the batch mix process.

SUMMARY OF THE INVENTION

The disclosed technology, therefore, solves the problem of preparing a stable acidizing fluid in a continuous process by using an imide compound as a surfactant to emulsify that acid in a hydrocarbon fluid. The composition and method disclosed herein significantly reduce mixing times, provides a simple additive, allowing for lower concentrations of the necessary chemicals, cost of special surface mixing equipment, less fluid preparation time and reduction of waste (resulting in less environmental exposure and costs).

One aspect of the invention is an acidizing well-bore stimulation fluid. The fluid includes an oil external emulsion of a hydrocarbon base fluid, an acidizing agent, and a surfactant. The surfactant itself encompasses an imide compound that is the reaction product of a hydrocarbyl-substituted acylating agent, and a nitrogen containing compound having a nitrogen atom capable of reacting with said hydrocarbyl-substituted acylating agent. The imide compound may or may not be carried in a hydrocarbon solvent.

The acidizing agent used in the well-bore stimulation fluid can contain, in addition to the acid or acid blend, additional additives, such as an acid corrosion inhibitor, acid corrosion intensifier, iron control agent, hydrogen sulfide scavenger, acid gelling agent, friction reducer, scale inhibitor, clay control agent and other surface active agents.

The acidizing agent may be an inorganic acid, an organic acid or combinations thereof. In some embodiments, the acidizing agent can be any one of hydrochloric acid (HCl), hydrofluoric acid (HF), sulfamic acid, urea hydrochloride, formic acid, acetic acid, citric acid, lactic acid, glycolic acid or combinations thereof. The acid can be present in the acidizing well-bore stimulation fluid in an amount of about 55% to about 90% by volume based on the total volume of the well-bore stimulation fluid.

The hydrocarbyl substituent of the hydrocarbyl-substituted acylating agent can have a number average molecular weight of from about 100 to about 5000. The hydrocarbyl substituent of the hydrocarbyl-substituted acylating agent can be a polyolefin, such as, for example, polyisobutylene.

The acylating agent of the hydrocarbyl-substituted acylating agent can be, for example, fumaric acid, itaconic acid, maleic acid, or combinations thereof.

In an embodiment, the hydrocarbyl-substituted acylating agent can be polyisobutenyl succinic anhydride or polyisobutenyl succinic acid.

The nitrogen containing compound used to prepare the imide compound can be an aliphatic hydrocarbyl-amine. In particular embodiments, the nitrogen containing compound can be a compound of formula:

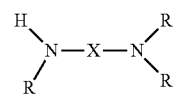

a compound of formula

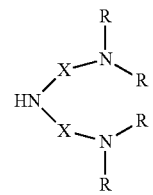

and mixtures thereof,
where X is an alkylene group containing from about 1 to about 4 carbon atoms and each R is, individually, a hydrogen or a C1 to C6 hydrocarbyl group.

In a specific embodiment, the nitrogen containing compound can be dimethylaminopropylamine.

The hydrocarbon base fluid used in the well-bore stimulation fluid can contain, in addition to the emulsifying surfactant, additional additives, such as a viscosifying agent, friction reducer, paraffin inhibitor or dispersant, and other surface active agents.

The hydrocarbon fluid can be at least one of crude oil, diesel fuel (including biodiesel), gasoline, xylene, or some other hydrocarbon fluid such as kerosene, xylene, d-limonene, naptha or solvent naptha, such as mineral spirits, carbon tetrachloride, or combinations thereof.

The hydrocarbon solvent can be any of the hydrocarbon fluids mentioned above, such as, for example, crude oil, diesel fuel (including biodiesel), gasoline, xylene, or some other hydrocarbon fluid such as kerosene, xylene, d-limonene, naptha or solvent naptha, such as mineral spirits, carbon tetrachloride, or combinations thereof.

The concentration of the surfactant in the hydrocarbon fluid is from about 0.01% by volume to about 2% by volume.

The ratio of the imide to the hydrocarbon solvent in the surfactant can be from about 1:1 to about 1:0.

The current technology also encompasses a method of emulsifying an acidizing agent in a hydrocarbon fluid. The method can include adding to the hydrocarbon fluid a surfactant as described above, that is, the imide compound or imide/solvent formulation described above. The acidizing agent is also added to the hydrocarbon fluid in the method, either before, at the same time, or after the surfactant.

In an embodiment, the method can include mixing the hydrocarbon fluid containing the surfactant and acidizing agent for less than 60 seconds. In another embodiment, the addition of the surfactant to the hydrocarbon fluid can be completed on-the-fly.

A method of stimulating a well-bore is also encompassed herein. The method can include preparing a well-bore stimulation fluid as described, followed by pumping the well-bore stimulation fluid down a well-bore.

The method can be performed at a well-bottom temperature of up to 500° F., and in a carbonate rock containing formation.

The method can also include the step of adding a viscosifying agent to the well-bore.

DETAILED DESCRIPTION OF THE INVENTION

Various preferred features and embodiments will be described below by way of non-limiting illustration.

The current technology encompasses a surfactant additive useful in preparing oil external emulsions for acidizing well-bore stimulation fluids.

The surfactant composition comprises, consists essentially of, or consists of an imide compound, either alone or carried in a suitable hydrocarbon solvent.

The Imide Compound

The surfactant in the well-bore stimulation fluid includes an imide compound. The production of the imide compound generally results in a mixture of compounds including an imide, and this mixture may be difficult to define apart from the process steps employed to produce the imide. Further, the process by which an imide is produced can be influential in imparting distinctive structural characteristics to the final imide product that can affect the properties of the product. Thus, in one embodiment, the imide compound included in the present technology may be described as a reaction product of (a) a hydrocarbyl substituted acylating agent, and (b) a nitrogen containing compound having a nitrogen atom capable of reacting with the hydrocarbyl substituted acylating agent. In particular, the hydrocarbyl-substituted acylating agent of (a) can consist of an acylating agent functionalized with a hydrocarbyl-substituent having a number average molecular weight of from about 100 to about 5000. The imide compound can be carried in a solvent.

As used herein, reference to an imide includes reference to the mixture of compounds prepared when preparing the imide, including the imide as described herein, as well as referring to the imide compound salt itself.

Details regarding the imide compound, and specifically, the hydrocarbyl-substituted acylating agent and the nitrogen containing compound are provided below.

The Hydrocarbyl Substituted Acylating Agent

The hydrocarbyl substituted acylating agent employed to prepare the imide compound can be the reaction product of the precursor to the hydrocarbyl-substituent, which is a long chain hydrocarbon, generally a polyolefin, with a monounsaturated carboxylic acid reactant such as (i) α,β-monounsaturated $C_4$ to $C_{10}$ dicarboxylic acids such as fumaric acid, itaconic acid, maleic acid, and the like; (ii) derivatives of (i) such as anhydrides or $C_1$ to $C_5$ alcohol derived mono- or di-esters of (i); (iii) α,β-monounsaturated $C_3$ to $C_{10}$ mono-carboxylic acid such as acrylic acid and methacrylic acid; or (iv) derivatives of (iii) such as $C_1$ to $C_5$ alcohol derived esters of (iii).

The hydrocarbyl-substituent is a long chain hydrocarbyl group. In one embodiment, the hydrocarbyl group can have a number average molecular weight (Mn) of from about 100 or 300 to about 5000, or from about 500 to about 4000. The Mn of the hydrocarbyl group can also be from about 750 or 1000 to about 3000. The Mn of the hydrocarbyl-substituent can also be from about 1500 to about 2800 or 2900, or from about 1700 to about 2700, or from about 1900 to about 2600, or about 2000 to about 2500. In an embodiment, the Mn can be from about 300 to about 750. The Mn of the hydrocarbyl-substituent can also be from about 350 to about 700, and in some cases from about 400 to about 600 or 650. In an embodiment, the hydrocarbyl-substituent can be any compound containing an olefinic bond represented by the general formula:

$$(R^1)(R^2)C=C(R^6)(CH(R^7)(R^8))) \qquad (I)$$

wherein each of $R^1$ and $R^2$ is, independently, hydrogen or a hydrocarbon based group. Each of $R^6$, $R^7$ and $R^8$ is, independently, hydrogen or a hydrocarbon based group; preferably at least one is a hydrocarbon based group containing at least 20 carbon atoms.

Olefin polymers for reaction with the monounsaturated carboxylic acids can include polymers comprising a major molar amount of $C_2$ to $C_{20}$, e.g. $C_2$ to $C_5$ monoolefin. Such olefins include ethylene, propylene, butylene, isobutylene, pentene, octene-1, or styrene. The polymers can be homopolymers such as polyisobutylene, as well as copolymers of two or more of such olefins such as copolymers of; ethylene and propylene; butylene and isobutylene; propylene and isobutylene. Other copolymers include those in which a minor molar amount of the copolymer monomers e.g., 1 to 10 mole % is a $C_4$ to $C_{18}$ diolefin, e.g., a copolymer of isobutylene and butadiene; or a copolymer of ethylene, propylene and 1,4-hexadiene.

In one embodiment, at least one R of formula (I) is derived from polybutene, that is, polymers of C4 olefins, including 1-butene, 2-butene and isobutylene. C4 polymers can include polyisobutylene. In another embodiment, at least one R of formula (I) is derived from ethylene-alpha olefin polymers, including ethylene-propylene-diene polymers. Ethylene-alpha olefin copolymers and ethylene-lower olefin-diene terpolymers are described in numerous patent documents, including European patent publication EP 0 279 863 and the following U.S. Pat. Nos. 3,598,738; 4,026,809; 4,032,700; 4,137,185; 4,156,061; 4,320,019; 4,357,250; 4,658,078; 4,668,834; 4,937,299; 5,324,800 each of which are incorporated herein by reference for relevant disclosures of these ethylene based polymers.

In another embodiment, the olefinic bonds of formula (I) are predominantly vinylidene groups, represented by the following formulas:

(II)

wherein R is a hydrocarbyl group

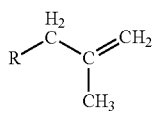

(III)

wherein R is a hydrocarbyl group.

In one embodiment, the vinylidene content of formula (I) can comprise at least about 30 mole % vinylidene groups, at least about 50 mole % vinylidene groups, or at least about 70 mole % vinylidene groups. Such material and methods for preparing them are described in U.S. Pat. Nos. 5,071,919; 5,137,978; 5,137,980; 5,286,823, 5,408,018, 6,562,913, 6,683,138, 7,037,999 and U.S. Publication Nos. 20040176552A1, 20050137363 and 20060079652A1, which are expressly incorporated herein by reference, such products are commercially available by BASF, under the tradename GLISSOPAL® and by Texas PetroChemical LP, under the tradename TPC 1105™ and TPC 595™.

Methods of making hydrocarbyl substituted acylating agents from the reaction of the monounsaturated carboxylic acid reactant and the compound of formula (I) are well known in the art and disclosed in the following patents: U.S. Pat. Nos. 3,361,673 and 3,401,118 to cause a thermal "ene" reaction to take place; U.S. Pat. Nos. 3,087,436; 3,172,892; 3,272,746, 3,215,707; 3,231,587; 3,912,764; 4,110,349; 4,234,435; 6,077,909; 6,165,235 and are hereby incorporated by reference.

In another embodiment, the hydrocarbyl substituted acylating agent can be made from the reaction of at least one carboxylic reactant represented by the following formulas:

(IV)

and

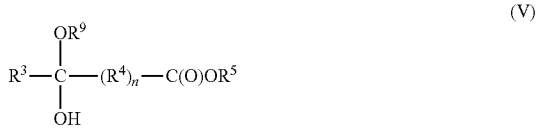

(V)

wherein each of $R^3$, $R^5$ and $R^9$ is independently H or a hydrocarbyl group, $R^4$ is a divalent hydrocarbylene group and n is 0 or 1 with any compound containing an olefin bond as represented by formula (I). Compounds and the processes for making these compounds are disclosed in U.S. Pat. Nos. 5,739,356; 5,777,142; 5,786,490; 5,856,524; 6,020,500; and 6,114,547.

In yet another embodiment, the hydrocarbyl substituted acylating agent can be made from the reaction of any compound represented by formula (I) with (IV) or (V), and can be carried out in the presence of at least one aldehyde or ketone. Suitable aldehydes include formaldehyde, acetaldehyde, propionaldehyde, butyraldehyde, isobutyraldehyde, pentanal, hexanal. heptaldehyde, octanal, benzaldehyde, and higher aldehydes. Other aldehydes, such as dialdehydes, especially glyoxal, are useful, although monoaldehydes are generally preferred. In one embodiment, aldehyde is formaldehyde, which can be supplied as the aqueous solution often referred to as formalin, but is more often used in the polymeric form as paraformaldehyde, which is a reactive equivalent of, or a source of, formaldehyde. Other reactive equivalents include hydrates or cyclic trimers. Suitable ketones include acetone, butanone, methyl ethyl ketone, and other ketones. Preferably, one of the two hydrocarbyl groups is methyl. Mixtures of two or more aldehydes and/or ketones are also useful.

Compounds and the processes for making these compounds are disclosed in U.S. Pat. Nos. 5,840,920; 6,147,036; and 6,207,839.

In another embodiment, the hydrocarbyl substituted acylating agent can include, methylene bis-phenol alkanoic acid compounds, the condensation product of (i) aromatic compound of the formula:

(VI)

wherein R is independently a hydrocarbyl group, Ar is an aromatic group containing from 5 to about 30 carbon atoms and from 0 to 3 optional substituents such as amino, hydroxy- or alkyl-polyoxyalkyl, nitro, aminoalkyl, carboxy or combinations of two or more of said optional substituents, Z is independently OH, lower alkoxy, $(OR^{10})_b OR^{11}$, or O— wherein each $R^{10}$ is independently a divalent hydrocarbyl group, $R^{11}$ is H or hydrocarbyl and b is a number ranging from 1 to about 30. c is a number ranging from 1 to about 3 and m is 0 or an integer from 1 up to about 6 with the proviso that m does not exceed the number of valences of the corresponding Ar available for substitution and (ii) at least on carboxylic reactant such as the compounds of formula (IV) and (V) described above. In one embodiment, at least one hydrocarbyl group on the aromatic moiety is derived from polybutene. In one embodiment, the source of hydrocarbyl groups are above described polybutenes obtained by polymerization of isobutylene in the presence of a Lewis acid catalyst such as aluminum trichloride or boron trifluoride.

Compounds and the processes for making these compounds are disclosed in U.S. Pat. Nos. 3,954,808; 5,336,278; 5,458,793; 5,620,949; 5,827,805; and 6,001,781.

In another embodiment, the reaction of (i) with (ii), optionally in the presence of an acidic catalyst such as organic sulfonic acids, heteropolyacids, and mineral acids, can be carried out in the presence of at least one aldehyde or ketone. The aldehyde or ketone reactant employed in this embodiment is the same as those described above. The ratio of the hydroxyaromatic compound:carboxylic reactant:aldehyde or ketone can be 2:(0.1 to 1.5):(1.9 to 0.5). In one embodiment, the ratio is 2:(0.8 to 1.1):(1.2 to 0.9). The amounts of the materials fed to the reaction mixture will normally approximate these ratios, although corrections may need to be made to compensate for greater or lesser reactivity of one component or another, in order to arrive at a reaction product with the desired ratio of monomers. Such corrections will be apparent to the person skilled in the art. While the three reactants can be reacted simultaneously to form the product, it is also possible to conduct the reaction sequentially, whereby the hydroxyaromatic is reacted first with either the carboxylic reactant and thereafter with the aldehyde or ketone, or vice versa. Compounds and the processes for making these compounds are disclosed in U.S. Pat. No. 5,620,949.

Other methods of making the hydrocarbyl substituted acylating agent can be found in the following reference, U.S. Pat. Nos. 5,912,213; 5,851,966; and 5,885,944 which are hereby incorporated by reference.

Nitrogen Containing Compound

The composition of the present invention contains a nitrogen containing compound having a nitrogen atom capable of reacting with the acylating agent to form the imide. The nitrogen containing compound can be aliphatic (linear, branched or heterocyclic) or aromatic. Perhaps the simplest embodiment is with the use of an aliphatic nitrogen containing compound.

In one embodiment, the nitrogen containing compound can be represented by the following formulas:

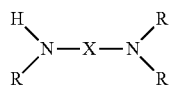
(VII)

wherein X is an alkylene group containing about 1 to about 4 carbon atoms; and each R can be, individually, a hydrogen or a C1 to C6 hydrocarbyl group. In one embodiment, X can be, for example, a C1, C2 or C3 alkyl group. In the same or different embodiments, each R can be, for example, H or a C1, C2 or C3 alkyl group.

Examples of the nitrogen containing compound capable of reacting with the acylating agent can include but is not limited to: dimethylaminopropylamine, N,N-dimethyl-aminopropylamine, N,N-diethyl-aminopropylamine, N,N-dimethyl-aminoethylamine ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene) triamine, the diaminobenzenes, the diaminopyridines or mixtures thereof. The nitrogen containing compounds capable of reacting with the acylating agent can further include aminoalkyl substituted heterocyclic compounds such as 1-(3-aminopropyl)imidazole and 4-(3-aminopropyl)morpholine, 1-(2-aminoethyl) piperidine, 3,3-diamino-N-methyldipropylamine, 3'3-aminobis(N,N-dimethylpropylamine).

In one embodiment, the nitrogen containing compound can be an imidazole, for example, as represented by the following formula:

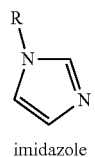
(IX)

imidazole wherein R is an amine capable of condensing with said hydrocarbyl-substituted acylating agent and having from 3 to 8 carbon atoms In one embodiment, the nitrogen containing compound can be represented by formula X:

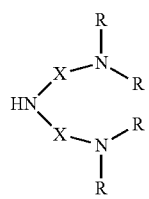
(X)

wherein each X can be, individually, a C1 to C6 hydrocarbyl group, and each R can be, individually, a hydrogen or a C1 to C6 hydrocarbyl group. In one embodiment, X can be, for example, a C1, C2 or C3 alkyl group. In the same or different embodiments, each R can be, for example, H or a C1, C2 or C3 alkyl group.

The hydrocarbyl substituted acylating agents and nitrogen containing compounds described above are reacted together to form an imide compound. Methods and process for reacting the hydrocarbyl substituted acylating agents and nitrogen containing compounds are well known in the art.

In embodiments, the reaction between the hydrocarbyl substituted acylating agents and nitrogen containing compounds can be carried out at temperatures of greater than about 80° C., or 90° C., or in some cases 100° C., such as between about 100 and about 150 or 200° C., or about 125 and about 175° C. At the foregoing temperatures water may be produced during the condensation, which is referred to herein as the water of reaction. In some embodiments, the water of reaction can be removed during the reaction, such that the water of reaction does not return to the reaction and further react.

The hydrocarbyl substituted acylating agents and nitrogen containing compounds may be reacted at a ratio of 1:1, but the reaction may also containing the respective reactants (i.e., hydrocarbyl substituted acylating agent:nitrogen containing compound) from about 3:1 to about 1:1.2, or from about 2.5:1 to about 1:1.1, and in some embodiments from about 2:1 to about 1:1.05.

While the process to prepare the imide can produce a mixture that is not readily definable apart from the process steps, certain structural components may be expected in some circumstances.

In some embodiments the imide compound can comprise, consist essentially of, or consist of an imide represented by the following formula:

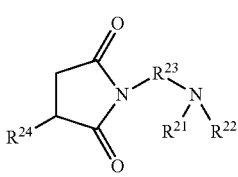
(XIV)

wherein: $R^{21}$ is H or a hydrocarbyl group containing from 1 to 10 carbon atoms; $R^{22}$ is H or a hydrocarbyl group containing from 1 to 10 carbon atoms; $R^{23}$ is a hydrocarbylene group containing from 1 to 20 carbon atoms; $R^{24}$ is a hydrocarbyl group containing from 92 to 215 carbon atoms, or from 107 to 200 or 210 carbon atoms, or from 120 to 195 carbon atoms, or from 135 to 190 or from 140 to 180 or 185 carbon atoms.

In some embodiments the imide compound can comprise, consist essentially of, or consist of an imide represented by the following formula:

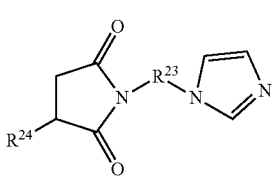
(XVIII)

wherein: $R^{23}$ is a hydrocarbylene group containing from 1 to 20 carbon atoms; $R^{24}$ is a hydrocarbyl group containing from 92 to 215 carbon atoms, or from 107 to 200 or 210 carbon atoms, or from 120 to 195 carbon atoms, or from 135 to 190 or from 140 to 180 or 185 carbon atoms.

Hydrocarbon Solvent

The imide compound described above can be employed in a hydrocarbon solvent carrier to assist its transport and storage. The surfactant composition can be added to a hydrocarbon base fluid before, at the same time, or after the addition of an acidizing agent in order to form the oil external emulsion, and as such the hydrocarbon solvent can be any solvent compatible with the hydrocarbon base fluid of the emulsion. Generally, the solvent can be, for example, any fluid produced from natural gas distillates, petroleum distillates, and the distillation of coal tar or peat. Really, any hydrocarbon base fluid that might be pumped into a well-bore, such as, for example crude oil, diesel fuel (including biodiesel), gasoline, xylene, or some other hydrocarbon fluid such as kerosene, xylene, d-limonene, naptha or solvent naptha, such as mineral spirits, carbon tetrachloride, or combinations thereof.

The imide compound can be included in the hydrocarbon solvent in a ratio of about 1:1 to about 10:1, or from about 1:1 to about 9:1, or even from about 2:1 to about 4:1.

Acidizing Well-Bore Stimulation Fluid

The surfactant described above is used to prepare a stable emulsion of an acidizing agent in a hydrocarbon base fluid. Acidizing well-bore stimulation fluids are known compositions, as are the various acidizing agents used therein. Any of the acidizing agents now known, or expectedly, developed in the future, may be employed as the acidizing agent in the instant acidizing well-bore stimulation fluid. Generally, acidizing agents encompass inorganic and organic acids, or combinations thereof. Examples of inorganic acidizing agents can include, for example, hydrochloric or hydrofluoric acid, sulfamic acid, and urea hydrochloride. Examples of organic acidizing agents include formic acid, acetic acid, citric acid, lactic acid, glycolic acid and combinations thereof. The acidizing agent can also be a combination of inorganic and organic acids, such as, for example, a mixture of hydrochloric acid with formic or acetic acid.

The hydrocarbon base fluid into which the acidizing agent and surfactant composition are mixed can be the same as the hydrocarbon solvents mentioned above, e.g., any fluid produced from natural gas distillates, petroleum distillates, and the distillation of coal tar or peat, including, for example, crude oil, diesel fuel (including biodiesel), gasoline, xylene, or some other hydrocarbon fluid such as kerosene, xylene, d-limonene, naptha or solvent naptha, such as mineral spirits, carbon tetrachloride, or combinations thereof.

The acidizing agent is generally present in the acidizing well-bore stimulation fluid in an amount of about 55% to about 90% by volume, based on the total volume of the acidizing well-bore stimulation fluid, and more specifically about 60% to about 80%. The acidizing agent can, in some embodiments, be present in an amount of about 65 to 75% by volume.

To prepare the emulsion, the surfactant composition can be added to the hydrocarbon base fluid in an amount of about 0.01% to about 2% by volume, based on the total volume (hydrocarbon base fluid, acidizing agent and surfactant) of the final acidizing well-bore stimulation fluid. In some embodiments, the surfactant can be added in amount of about 0.01% to about 1% or 1.5% by volume.

The surfactant, or the surfactant and acidizing agent can be added to the hydrocarbon base fluid "on-the-fly," and with very little mixing energy. By "on-the-fly" it is meant that the surfactant, or the surfactant and acidizing agent (in any order of addition) are continuously added to the hydrocarbon base fluid and pumped down the well-bore with little to know residence time needed to form the emulsion. Often, the shear encountered in the pipe while pumping the acidizing well-bore stimulation fluid down the well-bore will be sufficient to mix the components and create the stable emulsion, without adding any added mixing. In an embodiment, the addition of the surfactant, or surfactant and acidizing agent "on-the-fly" can mean that the stable oil external emulsion is prepared in less than about 60 seconds after the addition of the surfactant and acidizing agent. In some embodiments, the addition of the surfactant, or surfactant and acidizing agent "on-the-fly" can mean that the stable oil external emulsion is prepared in less than about 30 seconds, or even less than about 20 seconds. In other embodiments, development of the stable emulsion can occur in less than about 15 seconds or even in less than about 10 seconds.

In an embodiment, the acidizing well-bore stimulation fluid can be prepared by adding the surfactant composition to a mixture containing the acidizing agent and hydrocarbon base fluid. In another embodiment, the surfactant composition can be added along with the acidizing agent to the hydrocarbon base fluid to prepare the acidizing well-bore stimulation fluid. The surfactant can also be added to the hydrocarbon base fluid prior to adding the acidizing agent. It will be appreciated that the method of combining the surfactant, acidizing agent and hydrocarbon base fluid may be done in any manner now known or, likely, developed in the future. As noted above, the use of the surfactant composition disclosed herein allows the combining of the surfactant, acidizing agent, and hydrocarbon base fluid "on-the-fly."

In this regard, the acidizing well-bore stimulation fluid used to stimulate a hydrocarbon producing well-bore can be prepared in a rapid manner. The method of stimulation can include, for example, preparing the acidizing well-bore stimulation fluid and pumping it, "on-the-fly," down the well-bore.

Again, due to the surfactant composition disclosed herein, the acidizing well-bore stimulation fluid may be employed at well bottom temperatures up to and including about 500° F., while maintaining a stable emulsion. In some embodiments, the acidizing well-bore stimulation fluid may be employed at well bottom temperatures of from about 75° F. to about 450° F., or even from about 100 to about 400° F., or from about 175 to about 375° F.

The method of stimulating a well-bore discussed above may be carried out in a formation of carbonate rock, such as limestone, dolomite, or chalk. Additionally, it may be possible in some instances to extend its use to sandstone formations with high percentage of carbonates.

The acidizing well-bore stimulation fluid may include other additives employed in acidizing operations. For example, the composition may additionally include viscosifying agents, acid corrosion inhibitor, acid corrosion intensifier, iron control agent, hydrogen sulfide scavenger, acid gelling agent, friction reducer, scale inhibitor, clay control agent and other surface active agents.

In one embodiment, the acidizing well-bore stimulation fluid can be employed in stages wherein the acidizing well-bore stimulation fluid followed by a diverting agent (such as a gelled acid, in situ gelled acid, or viscoelastic surfactant acid system, for example), in a second stage or vice versa, where the stages are repeated for as many iterations as is necessary to stimulate the entire formation.

As used herein, the term "condensation product" is intended to encompass esters, amides, imides and other such materials that may be prepared by a condensation reaction of an acid or a reactive equivalent of an acid (e.g., an acid halide, anhydride, or ester) with an alcohol or amine, irrespective of whether a condensation reaction is actually performed to lead directly to the product. Thus, for example, a particular ester may be prepared by a transesterification reaction rather than directly by a condensation reaction. The resulting product is still considered a condensation product.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, byproducts, derivatives, and other such materials which are normally understood to be present in the commercial grade.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, including aliphatic, alicyclic, and aromatic substituents; substituted hydrocarbon substituents, that is, substituents containing non-hydrocarbon groups which, in the context of this invention, do not alter the predominantly hydrocarbon nature of the substituent; and hetero substituents, that is, substituents which similarly have a predominantly hydrocarbon character but contain other than carbon in a ring or chain. A more detailed definition of the term "hydrocarbyl substituent" or "hydrocarbyl group" is found in paragraphs [0137] to [0141] of published application US 2010-0197536.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

As used herein, the term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The invention herein is useful for making a formation produce hydrocarbons, which may be better understood with reference to the following examples.

EXAMPLES

Compounds

Compound 1—On a reaction plant, polyisobutylene succinic anhydride, which itself is prepared by reacting 1 mole 1000 number average molecular weight high vinylidene polyisobutylene and 1.2 moles maleic anhydride in a thermal "ene" reaction, is heated to 80° C. and charged to a jacketed reaction vessel fitted with stirrer, condenser, feed pump attached to subline addition pipe, nitrogen line and mantle/thermocouple/temperature controller system. The reaction vessel is heated to 100° C., where dimethylaminopropylamine (10.93 pbw) is charged to the reaction, maintaining the batch temperature below 120° C. The reaction mixture is then heated to 150° C. and held for 3 hours. The resulting product containing a polyisobutylene succinimide is cooled and collected.

Compound 2—A 1000 Mn polyisobutylene succinic anhydride is charged to a 2 L flask equipped with a water condenser, a thermocouple, a dropping funnel, an overhead stirrer, and nitrogen and heated to 90° C. Dimethylaminoethanol is added to the flask via the dropping funnel over 1 hour while maintaining the temperature below 120° C. Once all the dimethylaminoethanol is added, the reaction is slowly heated to 120° C. and maintained there for 2 hours. The resulting product contains a polyisobutylene succinic acid ester.

Compound 3—To a 4-neck flask equipped with a thermocouple, overhead agitator, addition funnel, N2 inlet and a water condenser and Dean-Stark trap is added diluent oil and a polyisobutylene succinic anhydride. The mixture is heated under nitrogen atmosphere with agitation. Once at temperature, a mixture of amine bottoms containing ethylene amine, polyethylene polyamines and other amines is added dropwise to the polyisobutylene succinic anhydride/oil mixture over about 1 hour. Once the amine addition is completed the mixture is heated to over 1 hour. The water produced during the heating period is collected in the Dean-Stark trap. Once at temperature, the reaction mixture is held at temperature for 3-5 hours then filtered to afford a reaction product of a polyisobutylene succinimide with amine bottoms.

Surfactants—Surfactants are prepared by placing one of Compounds 1 to 3 in a hot box to lower the viscosity of the Compound for pumping purposes. While heating the Compound, a hydrocarbon solvent is mixed in a separate vessel. The Compound is then added to the hydrocarbon solvent with mixing until the Compound and solvent are well blended.

Surfactant 1—A 70/30 ratio by weight of Compound 1 in petroleum naptha.

Surfactant 2—A 50/50 ratio by weight of Compound 1 in petroleum naptha.

Surfactant 3—A 60/40 ratio by weight of Compound 1 in petroleum naptha.

Surfactant 4—A 80/20 ratio by weight of Compound 1 in petroleum naptha.

Surfactant 5-100% Compound 1.

Surfactant 6—A 70/30 ratio by weight of Compound 2 in mineral oil.

Surfactant 7—A 60/40 ratio by weight of Compound 3 in mineral oil.

Surfactant 8—To a mixing vessel, an amide prepared from diethylenetriamine, fumaric acid and tall oil fatty acid is added. Acetic acid is then slowly added to the vessel with mixing. Ethylene glycol is then added and the blend is mixed for 15 minutes. Coco-amine is added and the blend is mixed for another 15 minutes, followed by addition of water. Ethoxylated castor oil is then mixed into the blend for 30 minutes.

Acidizing Well-bore Stimulation fluids—Acidizing well-bore fluids are prepared from Surfactants 1 to 8. An acid package of either 15% or 28% by weight hydrogen chloride gas in water is batch mixed. A hydrocarbon base fluid is added to a blender and a selected Surfactant is added to the hydrocarbon base fluid at a concentration level ("X") based on the expected total volume of the base fluid and HCl mixture. In other words, the gallons of Surfactant needed for a 1000 gallon volume of hydrocarbon base fluid plus HCl mixture (BF+HCl) is calculated, and the calculated amount of gallons is added to the hydrocarbon base fluid prior to adding the HCl mixture. The hydrocarbon and Surfactant are mixed for 15 seconds and the batch mixed acid is added slowly (10-15 seconds) to the mixture with mixing. Once all the acid is in the blender, the mixture is blended with a slight vortex for 15 to 20 seconds to produce the acidizing well-bore stimulation fluids (AWBS) set forth in the tables below.

| AWBS 1 | BF + HCL | 15% HCl Diesel | 70% 30% |
|---|---|---|---|
| | Surfactant 1 (gpt BF + HCl) | X | |
| AWBS 2 | BF + HCL | 28% HCl Diesel | 70% 30% |
| | Surfactant 1 (gpt BF + HCl) | X | |
| AWBS 3 | BF + HCL | 15% HCl Xylene | 70% 30% |
| | Surfactant 1 (gpt BF + HCl) | X | |
| AWBS 8 | BF + HCL | 28% HCl Diesel | 70% 30% |
| | Surfactant 3 (gpt BF + HCl) | X | |
| AWBS 9 | BF + HCL | 28% HCl Diesel | 70% 30% |
| | Surfactant 4 (gpt BF + HCl) | X | |
| AWBS 10 | BF + HCL | 28% HCl Diesel | 70% 30% |
| | Surfactant 5 (gpt BF + HCl) | X | |
| AWBS 4 | BF + HCL | 28% HCl Xylene | 70% 30% |
| | Surfactant 1 (gpt BF + HCl) | X | |
| AWBS 5 | BF + HCL | 15% HCl Escaid 110 Oil | 70% 30% |
| | Surfactant 1 (gpt BF + HCl) | X | |
| AWBS 6 | BF + HCL | 28% HCl Escaid 110 Oil | 70% 30% |
| | Surfactant 1 (gpt BF + HCl) | X | |
| AWBS 7 | BF + HCL | 28% HCl Diesel | 70% 30% |
| | Surfactant 2 (gpt BF + HCl) | X | |
| AWBS 11 | BF + HCL | 28% HCl Diesel | 70% 30% |
| | Surfactant 6 (gpt BF + HCl) | X | |
| AWBS 12 | BF + HCL | 28% HCl Diesel | 70% 30% |
| | Surfactant 7 (gpt BF + HCl) | X | |
| AWBS 13 | BF + HCL | 28% HCl Diesel | 70% 30% |
| | Surfactant 8 (gpt BF + HCl) | X | |

The example acidizing well-bore fluids were tested for emulsion stability. The fluids were poured into a roller oven cell, sealed, and pressurized to 200 psi with N2. The cells were then placed in an oven at the specified temperature and for the specified time. Once the time was up, the fluid was poured into a glass jar and both visually observed for any layering/phases and tested for electrical conductivity. If there was no layering/separation, and the fluid had an electrical conductivity of less than 20 µS, the fluid was considered stable for the specified time. Results of the stability testing of each acidizing well-bore fluid are provided in the tables below.

| Temperature | Emulsion Stability Time (Hrs) | Loading Rate of Emulsifier ("X") | | | | | |
|---|---|---|---|---|---|---|---|
| | | AWBS 1 | AWBS 2 | AWBS 3 | AWBS 4 | AWBS 5 | AWBS 6 |
| 150 F. | 12 | 0.5 gpt | 0.5 gpt | 0.5 gpt | 2.5 gpt | 0.5 gpt | 0.5 gpt |
| 200 F. | 8 | 1 gpt | 1 gpt | 1.5 gpt | 2.5 gpt | 0.5 gpt | 1 gpt |
| 250 F. | 6 | 1 gpt | 1 gpt | 2 gpt | 3 gpt | 2 gpt | 2 gpt |
| 300 F. | 2 | 2 gpt | 2 gpt | 4 gpt | 5 gpt | 3 gpt | 3 gpt |
| 325 F. | 0.5 | 2 gpt | 2 gpt | 4 gpt | 5 gpt | 3 gpt | 3 gpt |

| Temperature | Emulsion Stability Time (Hrs) | AWBS 7 | AWBS 8 | AWBS 9 | AWBS 10 | AWBS 11 | AWBS 12 | AWBS 13 |
|---|---|---|---|---|---|---|---|---|
| 150 F. | 12 | | | | | | | 7 gpt |
| 200 F. | 8 | | | | | | | 7 gpt |
| 250 F. | 6 | | | | | | | 7 gpt |
| 300 F. | 2 | 3 gpt | 2.5 gpt | 2 gpt | 2 gpt | >2 gpt | >2 gpt | 10 gpt |
| 325 F. | 0.5 | | | | | | | 10 gpt |

The fluids were also tested to determine the amount of time it took to reach a 50% non-emulsified mixture, also referred to as 50% break. The test involved the same steps from the stability tests above, except that the fluid was checked every hour to determine the level of break until the fluid is 50% E broken by visual observation.

| Temperature | AWBS 1 | Emulsion Stability Time (Hrs) |
|---|---|---|
| 150 F. | 0.5 gpt | 14 |
| 200 F. | 1 gpt | 12.5 |
| 250 F. | 1 gpt | 9.75 |
| 300 F. | 2 gpt | 8 |
| 325 F. | 2 gpt | 3 |

| Temperature | AWBS 2 | Emulsion Stability Time (Hrs) |
|---|---|---|
| 150 F. | 0.5 gpt | 13 |
| 200 F. | 1 gpt | 12.5 |
| 250 F. | 1 gpt | 9.55 |
| 300 F. | 2 gpt | 8 |
| 325 F. | 2 gpt | 3 |

| Temperature | AWBS 3 | Emulsion Stability Time (Hrs) |
|---|---|---|
| 150 F. | 0.5 gpt | 14 |
| 200 F. | 1.5 gpt | 12.5 |
| 250 F. | 2 gpt | 7.5 |
| 300 F. | 4 gpt | 9 |
| 325 F. | 4 gpt | 2 |

| Temperature | AWBS 4 | Emulsion Stability Time (Hrs) |
|---|---|---|
| 150 F. | 2.5 gpt | 13 |
| 200 F. | 2.5 gpt | 9 |
| 250 F. | 3 gpt | 8.5 |
| 300 F. | 5 gpt | 9 |
| 325 F. | 5 gpt | 2 |

| Temperature | AWBS 5 | Emulsion Stability Time (Hrs) |
|---|---|---|
| 150 F. | 0.5 gpt | 14 |
| 200 F. | 0.5 gpt | 8.25 |
| 250 F. | 2 gpt | 9.5 |
| 300 F. | 3 gpt | 7 |
| 325 F. | 3 gpt | 2 |

-continued

| Temperature | AWBS 6 | Emulsion Stability Time (Hrs) |
|---|---|---|
| 150 F. | 0.5 gpt | 14 |
| 200 F. | 1 gpt | 8 |
| 250 F. | 2 gpt | 10 |
| 300 F. | 3 gpt | 7.5 |
| 325 F. | 3 gpt | 2 |

| Temperature | AWBS 7 | Emulsion Stability Time (Hrs) |
|---|---|---|
| 300 F. | 3 gpt | 8 |

| Temperature | AWBS 8 | Emulsion Stability Time (Hrs) |
|---|---|---|
| 300 F. | 2.5 gpt | 9 |

| Temperature | AWBS 9 | Emulsion Stability Time (Hrs) |
|---|---|---|
| 300 F. | 2 gpt | 9 |

| Temperature | AWBS 10 | Emulsion Stability Time (Hrs) |
|---|---|---|
| 300 F. | 2 gpt | 19 |

| Temperature | AWBS 13 | Emulsion Stability Time (Hrs) |
|---|---|---|
| 150 F. | 7 gpt | 20 |
| 200 F. | 7 gpt | 8.5 |
| 250 F. | 7 gpt | 7 |
| 300 F. | 10 gpt | 9 |
| 325 F. | 10 gpt | 2.5 |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. An acidizing well-bore stimulation fluid comprising an oil external emulsion of
   a. a hydrocarbon base fluid,
   b. an acidizing agent, and
   c. a surfactant comprising:
      i. an imide compound that is the reaction product of
         1. a hydrocarbyl-substituted acylating agent, and
         2. a nitrogen containing compound having a nitrogen atom capable of reacting with said hydrocarbyl-substituted acylating agent comprising:
         (A) a compound of formula

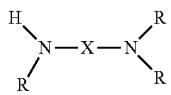

wherein X is an alkylene group containing about 1 to about 4 carbon atoms; and each R is, individually, a hydrogen or a $C_1$ to $C_6$ hydrocarbyl group;
   (B) a compound of formula

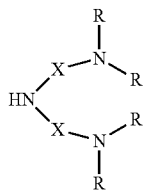

wherein each X is, individually, a $C_1$ to $C_6$ hydrocarbyl group, and each R is, individually, a hydrogen or a $C_1$ to $C_6$ hydrocarbyl group; or
   (C) mixtures of (A) and (B); and
      ii. a hydrocarbon solvent.

2. The well-bore stimulation fluid of claim 1, wherein the acidizing agent further comprises additional additives.

3. The well-bore stimulation fluid of claim 2, wherein the acidizing agent comprises an inorganic acid, an organic acid or combinations thereof.

4. The well-bore stimulation fluid of claim 3, wherein the acidizing agent comprises hydrochloric acid, hydrofluoric acid, sulfamic acid, urea hydrochloride, formic acid, acetic acid, citric acid, lactic acid, glycolic acid or combinations thereof.

5. The well-bore stimulation fluid of claim 1, wherein the acid is present in the acidizing well-bore stimulation fluid in an amount of about 55% to about 90% by volume, based on the total volume of the well-bore stimulation fluid.

6. The well-bore stimulation fluid of claim 1, wherein the hydrocarbyl substituent of the hydrocarbyl-substituted acylating agent has a number average molecular weight of from about 100 to about 5000.

7. The well-bore stimulation fluid of claim 1, wherein the hydrocarbyl substituent of the hydrocarbyl-substituted acylating agent comprises a polyolefin.

8. The well-bore stimulation fluid of claim 7, wherein the polyolefin is polyisobutylene.

9. The well-bore stimulation fluid of claim 1 wherein the acylating agent of the hydrocarbyl-substituted acylating agent comprises fumaric acid, itaconic acid, maleic acid, or combinations thereof.

10. The well-bore stimulation fluid of claim 1, wherein the hydrocarbyl-substituted acylating agent is polyisobutenyl succinic anhydride or polyisobutenyl succinic acid.

11. The well-bore stimulation fluid of claim 1, wherein the nitrogen containing compound comprises an aliphatic hydrocarbyl-amine.

12. The well-bore stimulation fluid of claim 1, wherein the nitrogen containing compound comprises dimethylaminopropylamine.

13. The well-bore stimulation fluid according to claim 1, wherein the hydrocarbon base fluid comprises at least one of crude oil, diesel fuel, biodiesel, gasoline, xylene, kerosene, xylene, d-limonene, naptha, solvent naptha, mineral spirits, or carbon tetrachloride.

14. The well-bore stimulation fluid according to claim 1, wherein the hydrocarbon base fluid contains the emulsifying surfactant and further comprises additional additives.

15. The well-bore stimulation fluid according to claim 1, wherein the hydrocarbon solvent comprises at least one of crude oil, diesel fuel, biodiesel, gasoline, xylene, kerosene, xylene, d-limonene, naptha, solvent naptha, mineral spirits, or carbon tetrachloride.

16. The well-bore stimulation fluid according to claim 1, wherein the concentration of the surfactant in the hydrocarbon fluid is from about 0.01% by volume to about 2% by volume.

17. The well-bore stimulation fluid according to claim 1, wherein the ratio of the imide to the hydrocarbon solvent in the surfactant is from about 1:1 to about 1:0.

18. The wellbore simulation fluid of claim 1, wherein the nitrogen containing compound having a nitrogen atom capable of reacting with said hydrocarbyl-substituted acylating agent is a compound of formula

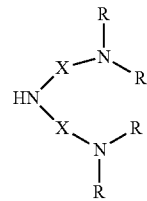

wherein each X is, individually, a $C_1$ to $C_6$ hydrocarbyl group, and each R is, individually, a hydrogen or a $C_1$ to $C_6$ hydrocarbyl group.

19. A method of stimulating a well-bore comprising:
a. preparing the well-bore stimulation fluid of claim 1, followed by
b. pumping the well-bore stimulation fluid down the well-bore.

20. The method of claim 19, wherein the method is performed at a well-bottom temperature of up to 500° F.

21. The method of claim 19, wherein the well-bore comprises carbonate rock.

22. The method of claim 19, additionally comprising the step of adding a viscosifying agent to the well-bore.

23. A method of emulsifying an acidizing agent in a hydrocarbon fluid, comprising the steps of:
a. adding to the hydrocarbon fluid a surfactant comprising:
   i. an imide compound that is the reaction product of
      1. a hydrocarbyl-substituted acylating agent, and
      2. a nitrogen containing compound having an oxygen or nitrogen atom capable of reacting with said hydrocarbyl-substituted acylating agent comprising:
         (A) a compound of formula

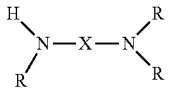

wherein X is an alkylene group containing about 1 to about 4 carbon atoms; and each R is, individually, a hydrogen or a $C_1$ to $C_6$ hydrocarbyl group;
(B) a compound of formula

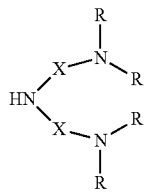

wherein each X is, individually, a $C_1$ to $C_6$ hydrocarbyl group, and each R is, individually, a hydrogen or a $C_1$ to $C_6$ hydrocarbyl group; or
(C) mixtures of (A) and (B); and
   ii. a hydrocarbon solvent; and
b. adding an acidizing agent to the hydrocarbon fluid.

24. The method of claim 23, further comprising the step of mixing the hydrocarbon fluid containing the surfactant and the acidizing agent.

25. The method of claim 23, further comprising mixing the hydrocarbon fluid containing the surfactant and acidizing agent for less than 60 seconds.

26. The method of claim 23, wherein the addition of the surfactant is completed on-the-fly.

* * * * *